United States Patent
Goss et al.

(10) Patent No.: US 12,498,810 B2
(45) Date of Patent: Dec. 16, 2025

(54) OPERATING DEVICE FOR A HOUSEHOLD APPLIANCE COMPRISING AN INTEGRATED TOUCH-SENSITIVE OPERATING RING IN AN OPERATING DEPRESSION

(71) Applicant: BSH Hausgeräte GmbH, Munich (DE)

(72) Inventors: Ulrich Goss, Munich (DE); Alexander Marsch, Feldkirchen-Westerham (DE); Christoph Ortmann, Munich (DE); Alice Russo, Munich (DE); Robert Sachon, Munich (DE); Jonas Vaas, Ellwangen/Jagst (DE)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 18/038,231

(22) PCT Filed: Nov. 16, 2021

(86) PCT No.: PCT/EP2021/081822
§ 371 (c)(1),
(2) Date: May 23, 2023

(87) PCT Pub. No.: WO2022/122316
PCT Pub. Date: Jun. 16, 2022

(65) Prior Publication Data
US 2023/0409134 A1  Dec. 21, 2023

(30) Foreign Application Priority Data
Dec. 8, 2020 (DE) .......................... 102020215501.1

(51) Int. Cl.
*G06F 3/041* (2006.01)
(52) U.S. Cl.
CPC .................................. *G06F 3/041* (2013.01)

(58) Field of Classification Search
CPC .......... G06F 3/041; F24C 7/086; D06F 34/32; F25D 2400/361
See application file for complete search history.

(56) References Cited

U.S. PATENT DOCUMENTS

| 2013/0268098 A1* | 10/2013 | Goss | ................... G05G 1/08 700/83 |
| 2017/0010804 A1 | 1/2017 | Min | |

(Continued)

FOREIGN PATENT DOCUMENTS

| DE | 7836484 U1 | 5/1979 |
| DE | 102005002952 A1 | 7/2006 |

(Continued)

OTHER PUBLICATIONS

National Search Report DE10 2020 215 501.1 dated Sep. 9, 2023.
International Search Report PCT/EP2021/081822 dated Feb. 13, 2022.

*Primary Examiner* — Temesghen Ghebretinsae
*Assistant Examiner* — Sosina Abebe
(74) *Attorney, Agent, or Firm* — Michael E. Tschupp; Andre Pallapies; Brandon G. Braun (57) ABSTRACT

An operating device for a household appliance includes a visual display unit, a touch-sensitive operating ring acting as a touch-sensitive operating region which is configured in a surface area of the visual display unit, and a transparent cover separate from the visual display unit and configured to cover the visual display unit. The cover has an upper side formed with a recess which is defined by a recess wall and configured as a continuous crater-like depression, when viewed as a whole, such that the recess wall in its entirety is configured in adjacent relation to the depression below a level of a surface area of the upper side. The recess wall includes an upper annular partial surface which forms a (Continued)

touch surface of the operating ring, and a further partial surface which adjoins the touch surface at a bottom thereof.

21 Claims, 3 Drawing Sheets

(56) References Cited

U.S. PATENT DOCUMENTS

| | | |
|---|---|---|
| 2017/0108960 A1 | 4/2017 | Lee |
| 2017/0269768 A1 | 9/2017 | Shin |
| 2018/0202666 A1 | 7/2018 | Mueller |
| 2018/0364816 A1* | 12/2018 | Krause ................ G06F 3/0362 |

FOREIGN PATENT DOCUMENTS

| | | | | |
|---|---|---|---|---|
| DE | 102007015570 A1 * | 10/2008 | ............ | F24C 15/024 |
| DE | 102008043351 A1 | 5/2010 | | |
| DE | 102018215789 A1 | 3/2020 | | |
| EP | 3064119 A1 | 9/2016 | | |
| WO | 2007025858 A1 | 3/2007 | | |

* cited by examiner

OPERATING DEVICE FOR A HOUSEHOLD APPLIANCE COMPRISING AN INTEGRATED TOUCH-SENSITIVE OPERATING RING IN AN OPERATING DEPRESSION

CROSS-REFERENCES TO RELATED APPLICATIONS

This application is the U.S. National Stage of International Application No. PCT/EP2021/081822, filed Nov. 16, 2021, which designated the United States and has been published as International Publication No. WO 2022/122316 A1 and which claims the priority of German Patent Application, Serial No. 10 2020 215 501.1, filed Dec. 8, 2020, pursuant to 35 U.S.C. 119(a)-(d).

The contents of International Application No. PCT/EP2021/081822 and German Patent Application, Serial No. 10 2020 215 501.1 are incorporated herein by reference in their entireties as if fully set forth herein.

BACKGROUND OF THE INVENTION

One aspect of the invention relates to an operating device for a household appliance. The operating device has a visual display unit. The operating device also has a touch-sensitive operating ring which is configured in the surface area of the visual display unit. The visual display unit is covered by a transparent cover. An upper side of the cover has a recess. The geometry of the operating ring is predetermined or defined by this recess. A further aspect of the invention relates to a household appliance comprising such an operating device.

Operating devices for household appliances comprising touch-sensitive operating regions are known in many different forms. In this context, a design is also disclosed in DE 10 2005 002 952 A1 in which a fixed groove is configured on an upper side of a cover of a light display. This groove serves to specify the geometry of the operating ring. A user can swipe along this groove by touching with the finger in order to trigger a corresponding touch-sensitive operation. The groove is configured as an oval ring. A touch-sensitive setting means is configured in the surface area framed by the groove which is closed over the circumference. This groove has two U-shaped contours which are arranged spaced apart from one another in a diameter cross section of the groove. When viewed in this cross section, these U-shaped contours are connected on the inner U-shaped limbs which face one another to a straight line which represents the region separate from the groove. The straight line terminates at the upper ends of these inner U-shaped limbs. The operating options are limited by this oval ring. Since the groove is fixed in terms of its geometry, users with fingers of different thicknesses can perform the operation only to a limited degree or poorly, since the finger does not quite fit with the fingertip in the grooves, for example. Thus it can lead to incorrect operations, or the user has an unpleasant sensation when having to press the fingertip into the grooves.

Since operating devices are designed to display ever more varied types of information, in particular also visually, and in this context image displays are also designed to be possible and, on the other hand, the construction is designed to be compact, an information overload of a user has to be avoided, on the one hand, and the information to be displayed has to be able to be perceived intuitively and presented clearly, on the other hand.

BRIEF SUMMARY OF THE INVENTION

It is the object of the present invention to provide an operating device and a household appliance in which the operation of an integrated operating ring is ergonomically improved.

This object is achieved by an operating device and a household appliance according to the independent claims.

One aspect of the invention relates to an operating device for a household appliance. The operating device comprises a visual display unit. Moreover, the operating device comprises a touch-sensitive operating ring. This operating ring represents a touch-sensitive operating region. The operating ring is configured in the surface area of the visual display unit. This means that, when viewed from the front in a projection of the operating device, the operating ring is arranged at least partially, in particular entirely, within the surface area of the visual display unit. The visual display unit is covered on the front side by a separate transparent cover of the operating device. A recess is configured on an upper side or front side of the cover. This recess is defined by a recess wall. The recess is configured as a continuous depression, when viewed as a whole. The depression is configured in a crater-like manner. In this regard, the depression can also be denoted, for example, as pot-like or funnel-like or bowl-shaped or in the manner of a blind hole. The recess wall of this depression is formed, in particular, in the manner of a spherical partial surface. This means that this entire recess wall, in particular, has the shape of a partial surface of a sphere. In particular, this can be a partial surface of a spherical segment. The entire recess wall is configured below the level of a surface area of the upper side adjacent to the depression. At least one upper annular partial surface of the recess wall forms a touch surface of the operating ring. The operating ring is fixed. The operating ring is integrated in the cover and thus is configured in one piece therewith. The recess wall has a further partial surface which is separate from the touch surface. This further partial surface adjoins the touch surface at the bottom thereof. This is understood to mean when viewed in the direction of the depression depth. In this regard, the depression has a depression axis which is perpendicular to the upper side of the cover. An improved operating concept can be achieved by such a design of a recess. Since the clear width of the recess is large, a user can reach into the depression with a finger in a simple manner. The clear width, in particular, is a multiple of a thickness of a fingertip of a finger. Contact with the very narrow edges of a groove, as is the case in the prior art, can be avoided. Moreover, the finger no longer has to be pressed with the fingertip into a very narrow and predetermined groove and then guided along within this groove. Thus an undesirable operating sensation due to such a finger being pressed tightly into the groove can be avoided by means of the invention. When viewed in terms of a cross-sectional geometry, therefore, from an upper annular edge of the depression only an air space is formed between opposing annular edge regions. When viewed over the entire diameter of the operating ring, therefore, with this cross-sectional view, only an air space is formed between these upper annular edge points. Moreover, improved operation and display options are also achieved by this concept. The recess is thus not a circumferential channel-like groove but, as already set forth above, a crater-like continuous depression. The entrance of the depression is thus not a ring but a continuous air surface without corners. This air surface can be a circular surface or an oval surface.

Last but not least, an improved visual representation of information over the region of the recess is also made possible by means of such a design. Thus a visual display can be implemented over the entire surface area of the depression which is defined by the recess wall. The perceptibility is improved by this design and the representation of continuous images is also made possible. In principle, this is not possible in a groove, as is the case in the prior art.

In one exemplary embodiment, the further partial surface is configured to be planar. In such an exemplary embodiment, therefore, the base of this depression is not curved but planar. This planar further partial surface is lowered downwardly relative to the surface area of the upper side of the cover directly adjacent to the depression. By means of such an exemplary embodiment, an approximately planar bearing surface can be provided such that potentially the finger is not immersed too deeply into the depression and is supported therein.

In one exemplary embodiment, this further partial surface of the recess wall is configured to be uneven. This results in many different options. This relates, on the one hand, to a further immersion of the finger in the depression. On the other hand, an individual visual display can also be presented thereby. Specific visual effects, such as enlargements and reductions, can also be made possible thereby.

In one exemplary embodiment, this further partial surface is bulged in a concave manner. In particular, it is bulged in a concave manner over its entire extent. This is a very advantageous exemplary embodiment since the depression can also be produced in a simple manner. This is because the depression can be produced in a very dimensionally accurate and simple manner by milling in the upper side of the cover. For example, the milling can be carried out here by using a ball nose. Thus a correspondingly symmetrical shape of the depression can be milled into this upper side. In this exemplary embodiment, therefore, the recess wall has exactly one spherical partial surface as its shape.

It is also possible that the second partial surface is bulged in a convex manner.

In one exemplary embodiment, the annular touch surface is bulged. This has advantages in terms of production, as has been mentioned above. This is because the entire recess wall can be generated with a ball nose milling cutter. In this regard, the concave bulged shape of the annular touch surface is then automatically achieved thereby. A haptically improved bearing concept for a finger on this touch surface can also be achieved thereby.

In one exemplary embodiment, the radius of the bulging of the annular touch surface is equal to the radius of the further partial surface. Thus a stepless transition is achieved between the touch surface and the further partial surface. Moreover, by means of this exemplary embodiment the depression can be generated in a particularly simple manner by a single ball nose milling cutter.

In one exemplary embodiment, the radius of the bulging of the annular touch surface is different from the radius of the further partial surface. In particular, the radius of the bulging of the annular touch surface is larger than the radius of the further partial surface. Such a geometry can be generated, for example, by two differently dimensioned ball nose milling cutters. In such an exemplary embodiment, therefore, a haptically perceptible transition between the touch surface and the further partial surface can also be achieved. Thus a stepped transition is configured here. This transition can be generated in a very minimalistic manner, for example by the radii only being very slightly different. In particular, the visual representation of information over the entire surface area of the recess is virtually unimpaired thereby. This small haptically perceptible stepped transition does not impair the visual display across the entire recess wall.

In one exemplary embodiment, printing is configured on a lower side of the cover. The lower side is that side of the cover which faces the visual display unit. In one exemplary embodiment, the surface area of the operating ring on the upper side is visually identified by the printing. Thus a viewer of the operating device, when viewing the depression, can also identify the operating ring in terms of its surface area.

In one exemplary embodiment, therefore, the printing is configured as a ring on this lower side. In particular, this ring has a radial ring thickness which corresponds to the radial dimensional difference between an upper edge of the operating ring and a lower edge of the operating ring. The upper edge of the operating ring is formed, in particular, by an upper annular edge. The lower edge of the operating ring is formed, in particular, by a lower annular edge. As a result, the dimensions of the printing can be minimized and yet, with a corresponding view of the depression from the front, the surface area of the operating ring can be identified clearly and extensively. The printing can be configured to be semi-transparent. As a result, a full-surface visual representation of information of the visual display unit can be implemented over the entire surface extent of the recess wall.

In one exemplary embodiment, a touch sensor system of the operating device is arranged between the cover and the separate visual display unit. This touch sensor system can be configured as a full-surface system and over the entire surface area of the visual display unit. However, it can also be configured only over a partial surface of the visual display unit. In particular, it can be configured at least over that surface area over which the depression extends, when viewed as a projection.

In one exemplary embodiment, an upper edge or an upper annular edge of the operating ring is formed by the upper edge of the depression. An upper annular edge of the operating ring is thus formed by an upper defining edge of the depression. In this regard, the terms "above" and "below" are to be understood to mean the respective position along a depression axis. In this regard, the depression axis is oriented perpendicularly to the upper side of the cover. The upper annular edge and the lower annular edge of the operating ring and thus also the upper edge of the depression are formed circumferentially around this depression axis.

In one exemplary embodiment, an upper edge of the operating ring has a diameter of between 60 mm and 90 mm, in particular of between 70 mm and 80 mm. This is the clear width, when viewed in a cross section, which is measured between these opposing positions or points of the upper edge.

In one exemplary embodiment, a lower edge of the operating ring has a diameter of between 45 mm and 60 mm, in particular of between 50 mm and 60 mm. In this regard, this is the clear width, when viewed in a cross section of the operating device.

In one exemplary embodiment, the depression along its depression axis has a depth which is between 1.1 mm and 1.7 mm, in particular between 1.3 mm and 1.5 mm.

Preferably, the cover has a thickness of between 3 mm and 5 mm, in particular of between 3.5 mm and 4.5 mm. The cover, in particular, is a glass plate. The cover is configured, in particular, from natural glass. The cover is transparent over the entire surface, in particular.

In one exemplary embodiment, the further partial surface of the recess wall is configured as a touch-sensitive operating region.

In one exemplary embodiment, in a cross-sectional view of the depression, the diameter contour is formed so as to be designed to be U-shaped over the entire width. In this regard, it is possible to implement a single U-shape with the same radius. It is also possible that a flattened portion or a flat portion is configured in the central region by this U-type shape. In this regard, different radii can also be implemented. It is also possible that this central region has an infinite radius and in this regard is a straight line. This diameter contour, which thus represents a cross section through the central point of the depression, in this regard has only a single U-type contour. The opposing ends of this diameter contour are the highest points. All other points of the diameter contour in this cross section are configured below these upper opposing two ends. Thus those points of this diameter contour which are radially furthest away from the depression axis are the highest points, when viewed in the axial direction of this depression axis.

In particular, the first partial surface has no intermediate minimum, when viewed in the diameter cross section of the depression. Thus there is no contour with two ends and a lower minimum located therebetween. Proceeding from an upper annular edge point, the contour of this first partial surface is oriented downwardly. A lower annular edge point of the lower annular edge in cross section represents the lowest point of this contour.

The operating ring is configured geometrically in the cover and thus together with its touch surface is configured in one piece therewith. The operating ring is thus formed fixedly in the cover. The outer contour and thus the defining wall of the recess are configured, in particular, without corners. The basic geometry of the operating ring is predetermined and defined by the outer contour or the upper edge.

A base of the recess can have, in particular, at least one optically imaging element. An optically imaging element, in particular, is an element which deflects the incident light beams. This means that the light beams do not pass in a rectilinear manner through the optically imaging element. The outer contour, in particular, is an outer upper annular edge.

The recess is thus designed such that, on the one hand, it has the operating ring, in particular the touch surface thereof, and, on the other hand, it has this base of the recess inwardly adjoining the operating ring. The base of the recess is thus not arranged in a plane of the upper side regions of the cover, which are configured radially outwardly adjoining the operating ring. The recess thus represents a depression or a type of crater.

It is made possible by means of such a design that a visual display of information can also be implemented in an improved manner over the entire surface, in the region of the recess or approximately directly on the recess. Thus, a specifically designed base is provided, in particular, immediately adjacent to the operating ring, in particular immediately adjacent to the interior of the operating ring. It is made possible thereby, in particular, by the optically imaging element at this locally specified position of the operating device, to be able to present visually displayed information in an improved manner. Thus the perceptibility for a user at this position can be improved. In particular, the understanding of the displayed visual information is thus also improved thereby.

In one exemplary embodiment, the visual display unit is configured for the continuous display of an image within the entire surface area of the recess and thus continuously over the entire recess wall. In this design, the visual display unit is thus not only configured for simply representing light, and thus for activating colored light to represent information, but also for representing images with different objects as image content and graphics. Thus information can also be visually and extensively represented thereby.

Moreover, by the use of the entire surface area of the recess, a more extensive and, in principle, larger representation of images of the display is made possible. Thus a visual display is made possible not only by the annular surface of the operating ring as such, but also on the surface area of this recess which is radially inwardly adjacent to the operating ring, namely the base.

In principle, the base represents that surface area of the recess which is directly radially inwardly adjacent to the operating ring.

In particular, the visual display unit is a display, in particular a full-surface display.

In one exemplary embodiment, the base or the second partial surface of the recess is configured as a touch-sensitive operating region. As a result, it serves not only for the specific visual display of visual information of the visual display unit, in particular of the display, but can also be used for setting the operating conditions. Thus a multifunctional visual display and operating concept is made possible in a locally specified and geometrically individually designed partial region of the operating device, in which the visual display unit is also arranged covering the surface therebehind.

In one exemplary embodiment, it is provided that a region which is directly adjacent to the recess and which is configured in the surface area of the visual display unit, in particular of the display, is configured as a further touch-sensitive operating region. Thus not only is a touch-sensitive actuation and thus an operation made possible particularly advantageously in the region of the recess and, in particular, on the operating ring and/or on the base of the recess, but such a touch-sensitive operation is also possible across and outwardly or adjacent to the side of the recess. Thus the concept of the touch-sensitive operation can be implemented in a more flexible and more variable manner. In particular, in this context it is also made possible that a continuous and thus uninterrupted touch-sensitive operation can also be implemented across the transition between the recess and the directly adjacent further touch-sensitive operating region. For example, such an operating concept can be implemented such that a touch-sensitive swiping is carried out along the touch-sensitive operating ring, and then is continued radially outwardly on this further touch-sensitive operating region of this touch-sensitive operation. In particular, this can be carried out without interruption. However, precisely the reverse procedure is also possible. Thus, for example, the touch-sensitive operation can be carried out at this further touch-sensitive operating region and, in particular, the touch-sensitive operation can be continued uninterrupted on the touch-sensitive operating ring and/or on the base of the recess. This is the case, in particular, when the base is also configured as a touch-sensitive operating region. Similarly, a touch-sensitive operation can be carried out on the base of the recess, in particular when this base is a touch-sensitive operating region, and an operation is carried out therefrom across the operating ring to the further touch-sensitive operating region. Relevant operating concepts can be both linear and thus rectilinear touch-sensitive actuations. However, non-rectilinear touch operations are also made possible. In this context, combinations of rectilinear and non-rectilinear touch operations are also made possible.

In one exemplary embodiment, the touch-sensitive operating region of the recess and the further touch-sensitive operating region, which directly radially outwardly adjoins this recess, are connected together such that an uninterrupted touch-operating movement can be carried out across both touch-sensitive operating regions.

In one exemplary embodiment, it is provided that the touch-sensitive operating region of the recess and the further touch-sensitive operating region outside the recess are configured for the continuous or uninterrupted representation of visual information, in particular images. Thus a visual presentation of information is also made possible with a continuous overall image which, however, extends over the surface area across the extent of the recess. This image then can also be perceived through the cover.

In particular the cover, in particular in the entire region of the display, is configured to be transparent.

In one exemplary embodiment, it is provided that the operating surface defining the recess is arranged in a cone-shaped manner. This annular wall also represents the annular surface of the operating ring. By this cone-shaped arrangement, on the one hand, the operating ring can be clearly defined in its geometric shape. On the other hand, the positioning of a finger on this annular wall is made possible very simply by the cone shape and a simple swiping is made possible with the finger in position. Moreover, a defined transition to the base which is offset downwardly or to the rear, or to the second partial surface of the recess, is also formed by the cone shape. The cone-shaped arrangement, or the orientation which is inclined or oblique relative to the plane or the cover or the upper side, permits the above-mentioned advantages regarding a simple operation and swiping and the improved geometric delimitation relative to the base of the recess.

In one exemplary embodiment, the visual display unit is configured for a dynamic moving picture display in the region of the recess, as a function of a touch operation of at least one touch-sensitive operating region. Thus a representation which is similar to a "picture carousel" is possible. In a further exemplary embodiment, the operating device has yet another touch-sensitive operating region. This is configured directly adjacent to the display. This means that in this further touch-sensitive operating region a visual display is not provided with the display, and also is not possible. Thus only a touch-sensitive interaction is configured therein.

In one exemplary embodiment, the operating device is designed such that, as a function of the type of operation of the touch-sensitive operation, a visual display which is adapted thereto on the visual display unit, in particular in the display, is shown at least in the region of the recess. This means, for example, that when the operating ring is operated touch sensitively, an individual visual display of information can be implemented by the display in the surface area of the operating ring. This can purely be a light activation and thus only one specific light color can be represented. However, additionally or alternatively, it is also possible that content information is also represented, such as for example numbers or letters or symbols. A representation of a graphic or a real image using one or more image objects in the image is thus also possible. In this context, image objects are visual representations of actual objects which exist in reality. For example, these image objects can be specific images of food or the like.

It is also possible, additionally or alternatively, that the visual display of the visual display unit is implemented at other positions as a function of the type of operation of the touch-sensitive operation of the specific region, for example of the touch-sensitive operating ring or the base of the recess which is advantageously configured to be touch-sensitive and/or the preferably present further touch-sensitive operating region adjacent to the recess. For example, in this context, when the touch-sensitive operating ring is touched, a visual display can be generated by the visual display unit in the region of the base of the recess and/or laterally adjacent to the recess. It is also possible that with a touch-sensitive operation of the base of the recess a visual display is implemented at this other position, for example in the surface area of the touch-sensitive operating ring, and/or laterally adjacent to the recess.

It is also possible, additionally or alternatively, that this is carried out by yet another touch-sensitive operating region which is configured laterally adjacent to the display. Combinations of these different touch-sensitive actuations and the resulting visual displays are also possible.

As already set forth above, in one exemplary embodiment a local touch-sensitive operation can be implemented here, for example swiping along the surface area of the touch-sensitive operating ring. A touch-sensitive operation only in the region of the base or the second partial surface of the recess is also possible. However, carrying out a continuous touch-sensitive operation across such geometrically different components is also possible. This has already been explained above in several examples.

Individual visual displays can also be implemented thereby as a function of the type, and relative to how many different such partial regions (touch-sensitive operating ring, touch-sensitive base, further touch-sensitive operating regions) are actuated in a continuous touch-sensitive operating process.

A full use of the entire surface area of the visual display unit, in particular of the display, is made possible by the above-mentioned designs of the operating device. In particular, a full visual display which is uninterrupted and which, in particular, can also represent images, in particular also dynamically changing images, is still possible in the region in which the display is covered on the front side by the recess in the cover. In particular, the cover in this region is fully transparent.

An operating device which has a full-surface visual display unit which extends across the entire display surface area, also preferably across the surface area of the recess, is also provided. In particular, when viewing the operating device as a projection, the recess is arranged entirely within the surface area of the visual display unit.

In terms of the design, in particular when viewed as a whole, and thus with its entire surface area, this recess represents a partial region of the display. In particular, in this context, an uninterrupted visual display is made possible in the region of the entire surface area of the recess. In particular, in this context, the surface area of the touch-sensitive operating ring is also configured to be fully transparent or the cover is configured to be fully transparent in the surface area of the touch-sensitive operating ring and in the surface area of the base of the recess.

A further aspect of the invention relates to a household appliance comprising an operating device according to the above-mentioned aspect or an advantageous design thereof. In particular, the household appliance is configured for preparing food. In this context, the household appliance can be a cooking appliance comprising a cooking compartment in which food can be prepared. The cooking appliance can be an oven or a steam cooking appliance or a microwave cooking appliance. However, it is also possible that the household appliance is also a cooktop.

The cover can also be made of natural glass or artificial glass.

The positions and orientations provided when the appliance is used as intended and arranged as intended are specified by the terms "above", "below", "front", "rear", "horizontal", "vertical", "depth direction", "width direction", "height direction", etc.

Further features of the invention are found in the claims, the figures and the description of the figures. The features and combinations of features mentioned above in the description and the features and combinations of features mentioned hereinafter in the description of the figures and/or shown individually in the figures are not only able to be used in the respectively specified combination but also in other combinations or alone without departing from the scope of the invention. Thus embodiments of the invention which are not explicitly shown and explained in the figures but which emerge from and can be generated by separate combinations of features from the explained embodiments are to be regarded as encompassed and disclosed. Embodiments and combinations of features, which thus do not have all of the features of an originally formulated independent claim, are also to be regarded as disclosed.

BRIEF DESCRIPTION OF THE DRAWINGS

Exemplary embodiments of the invention are explained in more detail hereinafter with reference to schematic drawings. In the drawings.

DETAILED DESCRIPTION OF EXEMPLARY EMBODIMENTS OF THE PRESENT INVENTION

Elements which are the same or functionally the same are shown in the figures with the same reference signs.

Figure 1:
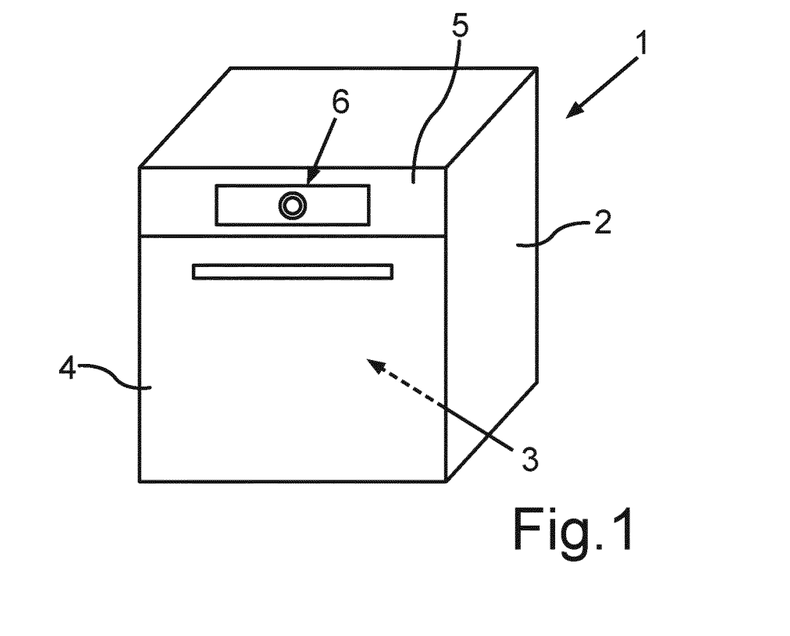
FIG. 1 shows a schematic view of an exemplary embodiment of a household appliance according to the invention with an exemplary embodiment of an operating device according to the invention.
Figure 2:
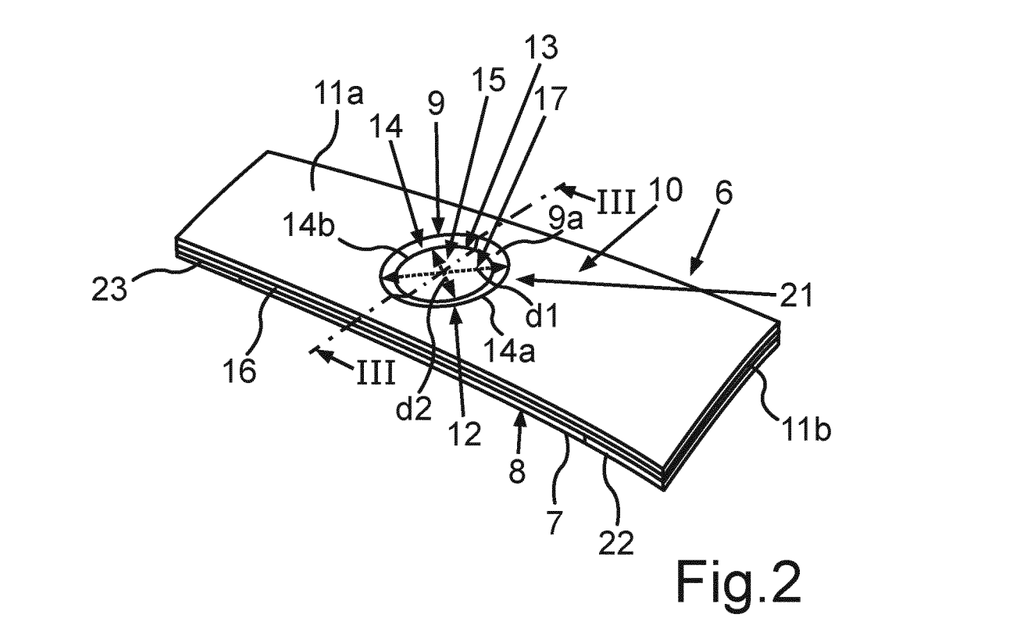
FIG. 2 shows a schematic perspective view of an exemplary embodiment of the operating device.

In FIG. 1 a household appliance 1 is shown in a schematic view. The household appliance 1 is configured here for preparing food. The household appliance can be a cooking appliance. For example, the household appliance can be cooktop. The household appliance, however, can also be an oven or a steam cooking appliance or a microwave cooking appliance. The household appliance 1 has a housing 2. A receiving space 3 is configured in this housing. This receiving space is, in particular, a cooking compartment. The receiving space 3 is able to be closed on the front side by a door 4. The household appliance 1 also has a control panel 5. In one exemplary embodiment, the household appliance 1 has an operating device 6. This operating device can be arranged, in particular, on the control panel 5. The operating device 6, as shown in FIG. 2 in a schematic and perspective view, has a visual display unit 7. This visual display unit is configured, in particular, as a display 8. In this context, therefore, the display of images and graphics can also be implemented. One or more image objects, which are thus tangible physical objects, can be displayed in images. For example, in this context, images of food can be represented.

The operating device 6 has a touch-sensitive operating ring 9. This touch-sensitive operating ring is configured, in particular entirely, in the surface area of the visual display unit 7 when viewed from the front as a projection.

Moreover, the operating device 6 has a cover 10. The cover 10 is a cover plate. The cover covers the visual display unit 7 on the front side. The cover 10 is configured, in particular, in one piece. The cover is configured to be transparent, in particular, is preferably configured to be fully transparent. In particular, the cover 10 is a glass plate. The cover 10 is a separate component from the visual display unit 7. The plate-shaped cover 10 has a front side or a front face or upper side 11a. The cover 10 has a rear side or a lower side 11b.

The upper side 11a faces away from the visual display unit 7. The upper side 11a is a front visible side and thus a touchable side.

As can also be identified in FIG. 1 the cover 10 has a recess 12. In this context, the recess 12 is configured as a depression. The recess 12 is defined by a recess wall 13. The recess 12, when viewed as a whole, is configured as a continuous depression. This depression is crater-like. It can also be denoted as pot-like or funnel-like or bowl-shaped. The recess wall 13 has the shape of a partial region of a spherical surface or a partially flattened or partially flat spherical surface.

The recess 12 is configured such that the entire recess wall 13 is located below the level of a surface area of the upper side 11a directly adjacent to the recess 12.

The recess wall 13 has at least one upper annular partial surface 14. This annular partial surface 14 is a touch surface 9a of the operating ring 9.

The operating ring 9 is a fixed component which is configured in one piece with the cover 10. The touch surface 9a is thus fixed. When positioning a finger and sliding the finger along the touch surface 9a, therefore, this touch surface 9a does not move.

The recess wall 13 has a further partial surface 15 which directly adjoins the touch surface 9a at the bottom thereof. The upper partial surface 14 has an upper annular edge 14a. In one exemplary embodiment, this upper annular edge also forms the upper edge of the recess 12. The upper partial surface 14 also has a lower annular edge 14b. This lower annular edge 14b also represents the limit to the lower second partial surface 15.

The operating device 6 also has a touch sensor system 16. This touch sensor system is arranged between the cover 10 and the visual display unit 7. The touch sensor system 16 is a sensor unit for detecting when the touch surface 9a is touched. The touch sensor system 16 is arranged on the rear side or the lower side 11b. The touch sensor system can be arranged over the entire surface on the lower side 11b or only partially therein. For example, only the operating ring 9 can be configured to be touch-sensitive with its touch surface 9a and the second partial surface 15 can be configured to be non-touch-sensitive. However, in an advantageous exemplary embodiment, the second partial surface 15 can also be configured to be touch-sensitive. As a result, the second partial surface 15 also has an operating region 17. In particular, the second partial surface is configured over the entire surface as a touch-sensitive operating region 17.

In particular, the touch surface 9a and/or the second partial surface 15 can also be provided as a display surface for the visual outputs of the visual display unit 7. In particular, these surfaces can be configured in each case over the entire surface as display surfaces. They can be combined together as a continuous display surface.

This recess 12 has a design without corners in the outer contour. This means that the upper annular edge 14a is configured without corners. The upper annular edge can be configured to be circular. However, it can also be configured to be oval. In particular, the lower annular edge 14b is configured without corners. It can be provided that a transition between the touch surface 9a and the second partial surface 15 is configured steplessly. However, a stepped transition can also be configured.

Figure 3:
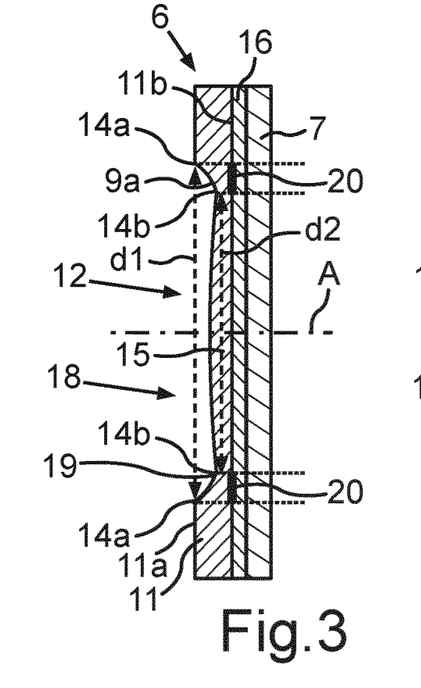
FIG. 3 shows a sectional view through an exemplary embodiment of the operating device according to FIG. 2.

In FIG. 3 a sectional view of an exemplary embodiment of the arrangement in FIG. 2 is shown along the cutting line III-III.

The cross-sectional view in FIG. 3 shows the recess 12 as the already explained depression 18. In this cross-sectional view which shows the diameter contour of the depression 18, a clear width on the upper annular edge 14a is represented. In this regard, the diameter d1 is shown. When viewed along this diameter d1, only an air space is configured between the opposing annular edge points of the upper annular edge 14a. No further point of the diameter contour, which is otherwise shown in this cross section, and thus of the recess wall 13 has in the axial direction to the depression axis A a layer or a level which is at the same height as these opposing positions or points of the upper annular edge 14a. Thus all points of the contour of the recess wall 13 in this cross section are configured below the level of these two annular edge points of the upper annular edge 14a. In the exemplary embodiment, this upper annular edge 14a also represents the upper edge of the operating ring 9. In this regard, the upper edge of the depression 18 is also associated therewith in the exemplary embodiment. In the exemplary embodiment, the upper end of the operating depression 18 is thus formed by this upper annular edge 14a and thus also the entrance of the depression 18 is defined in this regard. The entrance of the depression 18 in this regard is a circular surface or an oval surface which is a continuous surface. In this regard, the geometry of the air space is denoted at the entrance of this depression 18.

Moreover, it can also be identified in FIG. 3 that a stepped transition 19 is configured between the touch surface 9a and the second partial surface 15 of the recess wall 13 which follows downwardly. In the exemplary embodiment shown, the second partial surface 15 is bulged in a convex manner here.

As can also be identified in FIG. 3 in this cross-sectional view, the diameter contour is produced with a second diameter d2 which is formed at the lower annular edge 14b of the operating ring 9. This diameter d2 is smaller than the diameter d1.

In one exemplary embodiment, the touch surface 9a is bulged in a concave manner.

Figure 4:
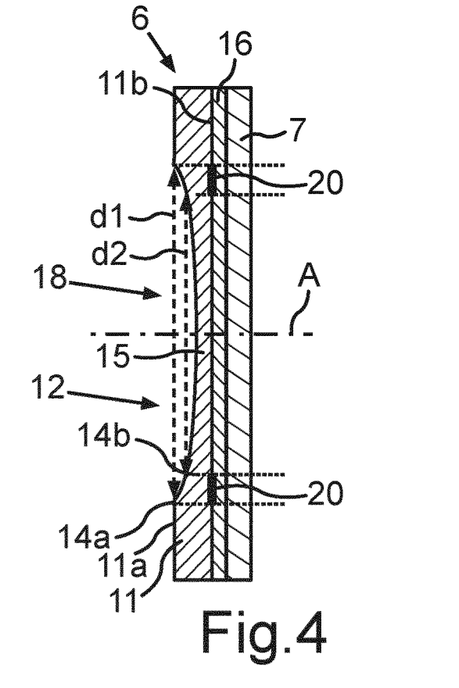
FIG. 4 shows a sectional view through a further exemplary embodiment of the operating device according to FIG. 2.

In FIG. 4 a further exemplary embodiment of an operating device 6 is shown. The sectional view here corresponds to FIG. 3. A diameter contour of the recess wall 13 is thus also shown here.

As in FIG. 3, printing 20 is also configured on the lower side 11b of the cover 11 in FIG. 4, and in particular also in the exemplary embodiment explained in more detail below. In the exemplary embodiment, this printing 20 is formed as a ring. As can also be identified in FIG. 3, the printing 20 extends circumferentially around the depression axis A. The printing 20 is configured in the radial direction and thus perpendicular to the depression axis A at the positions which extend between the radial position of the upper annular edge 14a and the radial position of the lower annular edge 14b. The printing 20 is not configured beyond this point. In the exemplary embodiment in FIG. 4, the second partial surface 15 is not curved in a convex manner. Rather, it is curved here in a concave manner. In one exemplary embodiment, the second partial surface can have the same radius as the first partial surface 14 or the touch surface 9a. In this context, the entire depression 18 can be generated by a ball nose milling cutter.

Figure 5:
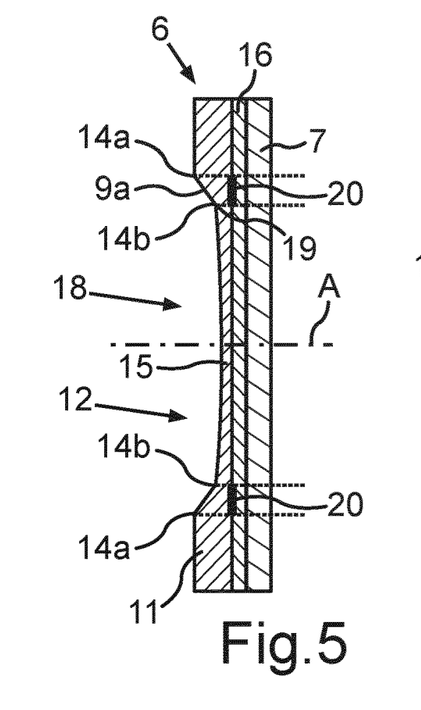
FIG. 5 shows a sectional view through a further exemplary embodiment of the operating device according to FIG. 2.

In a further exemplary embodiment according to FIG. 5, it is possible that the radius of the concave bulged second partial surface 15 is smaller than the radius of the first partial surface 14 and thus of the touch surface 9a. In contrast to a uniform radius in which a transition between the touch surface 9a and the second partial surface 15 is formed steplessly, with these different radii a stepped transition 19 is in turn produced.

Figure 6:
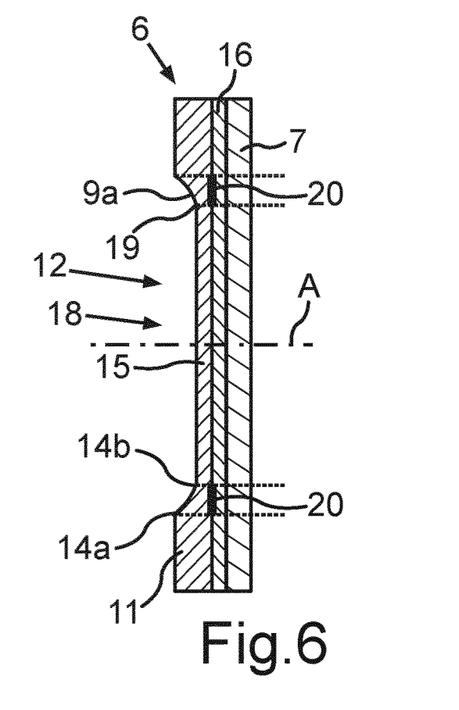
FIG. 6 shows a sectional view through a further exemplary embodiment of the operating device according to FIG. 2.

In FIG. 6 a further exemplary embodiment of an operating device 6 is shown in a sectional view, as shown in FIG. 3 and FIG. 4. A diameter contour of the recess wall 13 thus is also shown here. In this exemplary embodiment, the second partial surface 15 is not bulged. Rather, the second partial surface is configured here in a planar manner.

The diameters d1 and d2 are no longer illustrated in FIG. 5 and FIG. 6, but correspondingly apply here as they have been explained relative to FIG. 3 and FIG. 4.

Figure 7:
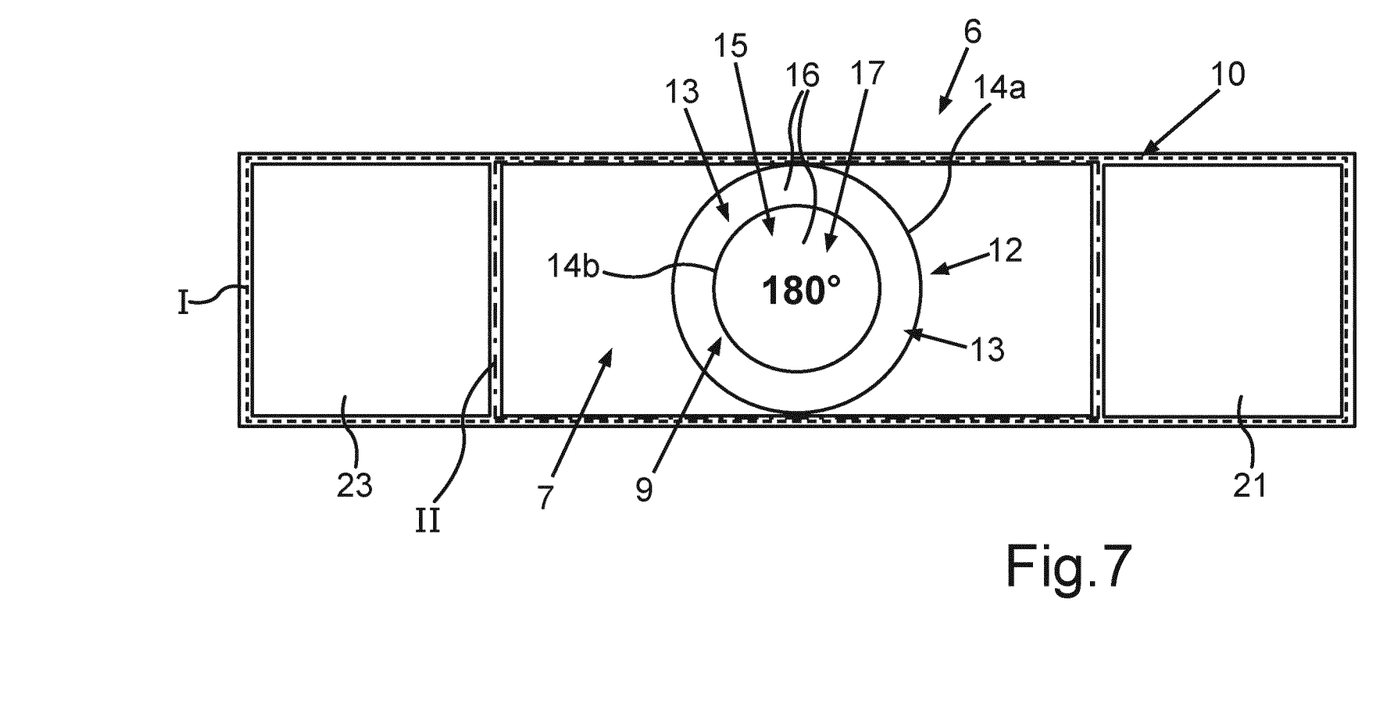
FIG. 7 shows a schematic view of partial regions of the operating device.

In a further exemplary embodiment, a region which is directly adjacent to the recess 12 and which is also contained within the surface area of the display 8, when the operating device 6 is viewed in a projection, is configured as a further touch-sensitive operating region 21 (FIGS. 2, 7).

In particular, the touch-sensitive operating region in the form of the touch-sensitive operating ring 9 and/or the touch-sensitive operating region of the second partial surface 15, on the one hand, and the further touch-sensitive operating region 21, are directly joined together such that an uninterrupted touch-operating movement can be carried out across both touch-sensitive regions. In particular, an individual setting of the operating conditions is thus made possible by this touch-operating movement.

It is also possible that the touch-sensitive operating region in the form of the touch-sensitive operating ring 9 and/or the second partial surface 15 which is configured to be touch-sensitive, on the one hand, and the further touch-sensitive operating region 21, are configured for a continuous representation of visual information, in particular images, which are generated by the visual display unit 7, in particular the display 8. Thus these images are also able to be represented continuously across the surface area of the recess 12 and, when viewing the cover 10, are correspondingly able to be perceived through this cover.

It is preferably provided that the visual display unit 7 is configured for a dynamic moving picture display in the region of the recess 12, as a function of a touch operation of at least one touch-sensitive operating region, in particular the second partial surface 15 which is configured to be touch-sensitive. For example, in this context, such a dynamic moving picture display can be achieved by a linear touch-operating movement on the second partial surface 15. A linear touch-operating movement can be carried out, for example, exclusively on the second partial surface 15. However, it can also be carried out in a combined manner on the second partial surface 15 leading toward the operating ring 9. It is also possible that such a linear touch-operating movement is carried out from the second partial surface 15 via the operating ring 9 to the further touch-sensitive operating region 21. Such linear touch-operating movements can be implemented horizontally, vertically or even obliquely.

As can also be identified in FIG. 2 and FIG. 7, in a further exemplary embodiment, yet another touch-sensitive operating region 22 and/or 23 of the operating device 6 is possible adjacent to the visual display unit 7. These further touch-sensitive operating regions 22 and/or 23 are preferably covered on the front side by the cover 10. A visual display in the surface area of the cover 10, with which these touch-sensitive operating regions 23 and/or 23 are covered, is thus not possible. This is because the visual display unit 7 does not reach as far as that point or is not configured as far as that point.

In this exemplary embodiment, it is thus also possible that a touch operation is also carried out at least proportionally on the upper side 11*a* in the surface area in which the further touch-sensitive regions 23 and/or 23 are configured.

In an advantageous exemplary embodiment, it is possible that individual surface areas, such as the individual touch-sensitive operating regions, such as the operating ring 9, and also the second partial surface 15 and/or the operating regions 21 and/or 22 and/or 23, are potentially individually visually identified. For example, linear boundaries of the respective surface geometry or the geometric extent can be displayed here by the visual display unit 7. This can be permanent or dynamically changing. For example, this can also be dependent on the type of operation. It is also possible, for example, for proximity sensors of the operating device 6 to be present here, said proximity sensors identifying an approach to specific surface areas and thus operating regions. This geometric visual identification can thus be carried out as a function thereof.

It is also possible that in an operating process, and thus when touching such a specific operating region, the swiping and thus the touched operating path is made visually recognizable. For example, this can be implemented simply by the representation of color. Additionally or alternatively, however, content information such as letters and/or numbers and/or symbols can also be represented.

In FIG. 7 a front view of the operating device 6 is shown in a schematic view. The entire surface area of the cover 10 is represented by the line I. The surface area which represents the visual display unit 7 is represented by the further dashed-dotted line II. As can be identified in this projected view, the surface area of the visual display unit 7 is entirely within the surface area of the cover 10. It can also be identified that the surface area of the operating ring 9 and the surface area of the second partial surface 15 are arranged entirely within the surface area of the visual display unit 7. By the transparent design of the touch surface 9*a* in the region of the cover 10 and the transparent design of the surface of the second partial surface 15, images can also be displayed by the visual display unit 7 in the entire surface area of this recess 12 and can be perceived through the cover 10.

LIST OF REFERENCE SIGNS

1 Household appliance
2 Housing
3 Receiving space
4 Door
5 Control panel
6 Operating device
7 Display unit
8 Display
9 Operating ring
9*a* Touch surface
10 Cover
11*a* Upper side
11*b* Lower side
12 Recess
13 Recess wall
14 First partial surface
14*a* Upper annular edge
14*b* Lower annular edge
15 Second partial surface
16 Touch sensor system
17 Operating region
18 Depression
19 Stepped transition
20 Printing
21 Operating region
22 Operating region
23 Operating region
d1 Diameter
d2 Diameter

The invention claimed is:

1. An operating device for a household appliance, said operating device comprising:
a visual display unit;
a touch-sensitive operating ring acting as a touch-sensitive operating region which is configured in a surface area of the visual display unit, and
a transparent cover separate from the visual display unit and configured to cover the visual display unit, said cover having an upper side formed with a recess which is defined by a recess wall and configured as a continuous crater-like depression, when viewed as a whole, such that the recess wall in its entirety is configured in adjacent relation to the depression below a level of a surface area of the upper side, said recess wall including an upper annular partial surface which forms a touch surface of the operating ring, and a further partial surface which adjoins the touch surface at a bottom thereof.

2. The operating device of claim 1, wherein the further partial surface is planar.

3. The operating device of claim 1, wherein the further partial surface is uneven.

4. The operating device of claim 1, wherein the further partial surface is bulged in a concave manner.

5. The operating device of claim 1, wherein the touch surface is annular and bulged.

6. The operating device of claim 5, wherein the touch surface is bulged in a concave manner to define a concave bulging.

7. The operating device of claim 6, wherein the bulging of the touch surface is defined by a radius which is equal to a radius of the further partial surface.

8. The operating device of claim 6, wherein the bulging of the touch surface is defined by a radius which is different from a radius of the further partial surface.

9. The operating device of claim 6, wherein the bulging of the touch surface is defined by a radius which is larger than a radius of the further partial surface.

10. The operating device of claim 1, wherein the cover has a lower side formed with a printing to visually identify a surface area of the operating ring on the upper side of the cover.

11. The operating device of claim 10, wherein the printing is configured as a ring on the lower side of the cover.

12. The operating device of claim 10, wherein the printing is configured only as a ring on the lower side of the cover.

13. The operating device of claim 11, wherein the ring has a radial ring thickness which corresponds to a radial dimensional difference between an upper annular edge of the operating ring and a lower annular edge of the operating ring.

14. The operating device of claim 1, further comprising a touch sensor system arranged between the cover and the visual display unit.

15. The operating device of claim 1, wherein the operating ring has an upper annular edge which is formed by an upper edge of the depression.

16. The operating device of claim 1, wherein the operating ring has an upper annular edge defined by a diameter of between 60 mm and 90 mm.

17. The operating device of claim 1, wherein the operating ring has an upper annular edge defined by a diameter of between 70 mm and 80 mm.

18. The operating device of claim 1, wherein the operating ring has a lower annular edge defined by a diameter of between 45 mm and 60 mm.

19. The operating device of claim 1, wherein the operating ring has a lower annular edge defined by a diameter of between 50 mm and 60 mm.

20. The operating device of claim 1, wherein the further partial surface of the recess wall is configured as a touch-sensitive operating region.

21. An operating device for a household appliance, said operating device comprising:
a visual display unit;
a touch-sensitive operating ring acting as a touch-sensitive operating region which is configured in a surface area of the visual display unit, and a transparent cover that is separate from the visual display unit and configured to cover the visual display unit,
wherein the transparent cover includes a recess formed in an upper side of the transparent cover,
wherein the recess includes a recess wall and is configured as a continuous crater-like depression when viewed as a whole,
wherein the recess wall includes:
an upper annular partial surface which forms a touch surface of the touch-sensitive operating ring, and
a further partial surface which adjoins the touch surface at a bottom of the recess wall, and
wherein the recess wall in its entirety is located below a level of a surface of the upper side of the transparent cover that is directly adjacent to the recess of the transparent cover.

* * * * *